(12) United States Patent
Korolev

(10) Patent No.: US 11,650,655 B2
(45) Date of Patent: May 16, 2023

(54) POWER MANAGEMENT FOR LOOP-POWERED FIELD DEVICES WITH LOW POWER WIRELESS COMMUNICATION

(71) Applicant: Rosemount Inc., Shakopee, MN (US)

(72) Inventor: Yevgeny Korolev, Maple Grove, MN (US)

(73) Assignee: Rosemount Inc., Shakopee, MN (US)

( * ) Notice: Subject to any disclaimer, the term of this patent is extended or adjusted under 35 U.S.C. 154(b) by 137 days.

(21) Appl. No.: 17/216,830

(22) Filed: Mar. 30, 2021

(65) Prior Publication Data

US 2022/0317763 A1 Oct. 6, 2022

(51) Int. Cl.
*G06F 1/00* (2006.01)
*G06F 1/3296* (2019.01)
(Continued)

(52) U.S. Cl.
CPC .......... *G06F 1/3296* (2013.01); *G06F 9/4418* (2013.01); *H04L 12/10* (2013.01);
(Continued)

(58) Field of Classification Search
CPC ..... G06F 1/3296; G06F 9/4418; H04L 12/10; H04W 4/80; H04W 52/0209
(Continued)

(56) References Cited

U.S. PATENT DOCUMENTS 8,160,535 B2 * 4/2012 Kielb ..................... G08C 17/02
455/343.1
10,219,134 B2 2/2019 Chen et al.
(Continued)

OTHER PUBLICATIONS

International Search Report and Watlen Opinion for International Patent Application No. PCT:US2022/021266, dated Jun. 30, 2022, 11 pages.

*Primary Examiner* — Volvick Derose
(74) *Attorney, Agent, or Firm* — Christopher R. Christenson; Kelly, Holt & Christenson PLLC

(57) ABSTRACT

A loop-powered field device includes a plurality of terminals coupleable to a process communication loop and a loop control module coupled to one of the plurality of terminals and configured to control an amount of current flowing through the loop control module based on a control signal. A field device main processor is operably coupled to the loop control module to receive its operating current (I_Main) from the loop control module and is configured to provide the control signal based on a process variable output. A low power wireless communication module is operably coupled to the loop control module to receive its operating current (I_BLE) from the loop control module. The low power wireless communication module is communicatively coupled to the field device main processor. The low power wireless communication module has an active mode and a sleep mode. The low power wireless communication module is configured to obtain a measurement of operating current (I_BLE) available while the low power wireless communication module is in the sleep mode and modify an active cycle of the low power wireless communication module based on the measurement of operating current (I_BLE).

17 Claims, 5 Drawing Sheets

(51) Int. Cl.
*H04W 4/80* (2018.01)
*G06F 9/4401* (2018.01)
*H04W 52/02* (2009.01)
*H04L 12/10* (2006.01)
*G06F 1/3203* (2019.01)

(52) U.S. Cl.
CPC ......... *H04W 4/80* (2018.02); *H04W 52/0209* (2013.01); *G06F 1/3203* (2013.01)

(58) Field of Classification Search
USPC ........................................................ 713/323
See application file for complete search history.

(56) References Cited

U.S. PATENT DOCUMENTS

| | | | |
|---|---|---|---|
| 10,237,712 B2 | 3/2019 | Gopalakrishnan et al. | |
| 10,367,540 B1* | 7/2019 | Medapalli | G10L 15/30 |
| 10,437,216 B2 | 10/2019 | Seiler et al. | |
| 11,378,480 B2* | 7/2022 | Broden | G01L 19/147 |
| 2008/0280568 A1* | 11/2008 | Kielb | G01D 21/00 340/12.3 |
| 2011/0098939 A1* | 4/2011 | Rezvani | G01N 27/4165 702/30 |
| 2012/0036335 A1* | 2/2012 | van Winkelhoff | G11C 7/08 327/299 |
| 2012/0220351 A1* | 8/2012 | Kerai | H04W 84/20 455/574 |
| 2014/0273895 A1* | 9/2014 | Korolev | G06K 19/0717 455/114.2 |
| 2016/0212708 A1* | 7/2016 | Kim | H04W 52/0229 |
| 2017/0088072 A1* | 3/2017 | Curtis | G08B 31/00 |
| 2017/0359675 A1* | 12/2017 | Gopalakrishnan | H04L 69/08 |
| 2018/0115953 A1* | 4/2018 | Shellhammer | H04W 52/0216 |
| 2018/0122119 A1* | 5/2018 | Dotterweich | G06F 3/0482 |
| 2019/0103914 A1* | 4/2019 | Junk | H04W 12/10 |
| 2019/0246353 A1* | 8/2019 | Jensen | H04L 67/12 |
| 2020/0076214 A1* | 3/2020 | Mifsud | H02J 7/0047 |
| 2022/0047178 A1* | 2/2022 | Rogers | A61B 5/681 |
| 2022/0099516 A1* | 3/2022 | Holm | G01L 19/142 |

* cited by examiner

POWER MANAGEMENT FOR LOOP-POWERED FIELD DEVICES WITH LOW POWER WIRELESS COMMUNICATION

BACKGROUND

A field device is a device that is coupleable to a process, such as a manufacturing or refining process, to support the process by providing one or more functions of measuring and controlling parameters associated with the process. A field device is so named due to its ability to be mounted in the field. "Field" is generally an external area in a process installation that may be subject to climatological extremes, vibration, changes in humidity, electromagnetic or radiofrequency interference, or other environmental challenges. Thus, the robust physical package of such a field device provides it with the ability to operate in the "field" for extended periods (such as years) at a time.

Field devices such as process variable transmitters, are used in the process control industry to remotely sense a process variable. Field devices such as actuators, are used by the process control industry to remotely control physical parameters of a process, such as flow rate, temperature, etc. The process variable may be transmitted to a control room from a field device such as a process variable transmitter for providing information about the process to a controller. The controller may then transmit control information to a field device such as an actuator to modify a parameter of the process. For example, information related to pressure of a process fluid may be transmitted to a control room and used to control a process such as oil refining.

Process variable transmitters are used to monitor process variables associated with fluids such as slurries, liquids, vapors and gasses in chemical, pulp, petroleum, gas, pharmaceutical, food and other fluid processing plants. Process variables include pressure, temperature, flow, level, pH, conductivity, turbidity, density, concentration, chemical composition and other fluid properties. Process actuators include control valves, pumps, heaters, agitators, coolers, solenoids, vents and other fluid controlling devices.

One typical technique for transmitting information involves controlling the amount of current flowing through a process control loop. Current is supplied from a current source in the control room and the process variable transmitter controls the current from its location in the field. For example, a 4 mA signal can be used to indicate a zero reading and a 20 mA signal can be used to indicate a full scale reading. In some instances, digital information can be superimposed on the 4-20mA signal for additional communication capabilities. One example of a process communication protocol that superimposes digital communication on a 4-20 mA signal is the Highway Addressable Remote Transducer (HART) protocol. Additionally, it is possible for such devices to receive their entire operating power from the 4-20 mA current loop. These devices are considered "loop-powered."

Recently, attempts have been made to incorporate general purpose wireless communication in such loop-powered device in the form of a Bluetooth Low Energy (BLE) module. BLE is a wireless communication technology that operates in a communication spectrum of 2.4-2.4835 GHz with channels that are a subset of classic Bluetooth channels. BLE is intended to provide reduced power and expense, in comparison to classic Bluetooth, while maintaining similar communication range.

BLE provides the field device with the ability to communicate wirelessly to nearby general purpose devices, such as smartphones and/or tablets. This simplification provides significant convenience for users who need to interact with the field devices for such tacks as commissioning, calibrating, maintaining, troubleshooting, and repairing such field devices. However, a BLE module can easily consume more power than can be supplied by the 4-20 mA current loop to which such loop-powered device is coupled. Thus, there is a need to provide better power management for loop-powered field devices in order to increase compatibility with and adoption of BLE in loop-powered field devices.

SUMMARY

A loop-powered field device includes a plurality of terminals coupleable to a process communication loop and a loop control module coupled to one of the plurality of terminals and configured to control an amount of current flowing through the loop control module based on a control signal. A field device main processor is operably coupled to the loop control module to receive its operating current (I_Main) from the loop control module and is configured to provide the control signal based on a process variable output. A low power wireless communication module is operably coupled to the loop control module to receive its operating current (I_BLE) from the loop control module. The low power wireless communication module is communicatively coupled to the field device main processor. The low power wireless communication module has an active mode and a sleep mode. The low power wireless communication module is configured to obtain a measurement of operating current (I_BLE) available while the low power wireless communication module is in the sleep mode and modify an active cycle of the low power wireless communication module based on the measurement of operating current (I_BLE).

DETAILED DESCRIPTION OF ILLUSTRATIVE EMBODIMENTS

When providing a field device with integrated BLE, it is challenging to provide maximum Bluetooth data throughput at available input power for loop-powered devices. Moreover, the available input power to the Bluetooth system often is not enough to support continuous BLE operation. Therefore, an energy storage capacitor is utilized. In accordance with various embodiments described below, a low cost and energy efficient method is provided to detect the available input power to the Bluetooth system and to adjust Bluetooth data throughput in accordance with the available input power. While embodiments of the present invention will be described with respect to communication using Bluetooth Low Energy, it is expressly contemplated that embodiments are practicable with other types of low power wireless communication.

Figure 1:
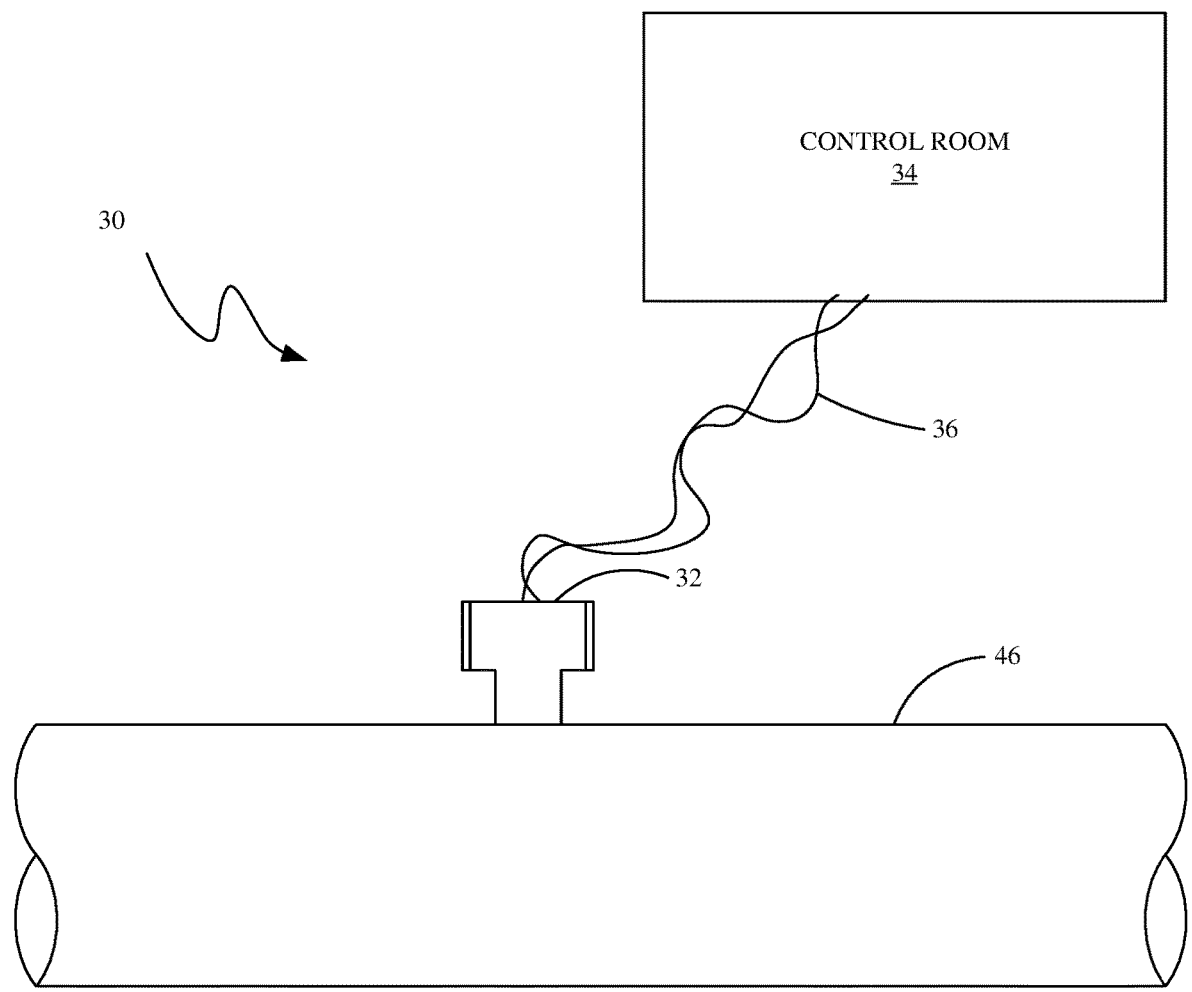
FIG. 1 is a system block diagram of a process control system illustrating an environment in which embodiments described herein are useful.

FIG. 1 is a system block diagram of process control system 30 illustrating one particular environment in which embodiments described herein are useful. Process control system 30 includes process device 32 coupled to control room 34 via process control loop 36. Process device 32 is coupled to a process fluid container, such as pipe 46. A field device, as used herein, is any device which either relates a signal to a process parameter, or responsively effects a change in a process parameter. As such, field device 32 may be a process variable transmitter sensing a process variable such as pressure, temperature or a level in a process container such as pipe 46. Further, field device 32 may also be a device that monitors operation of a process or sends information related to the process on a process control loop. Process control loop 36 couples process device 32 to control room 34 and supplies energization current to field device 32. In the illustrated example, process control loop 36 is a two-wire 4-20 mA process control loop.

Figure 2:
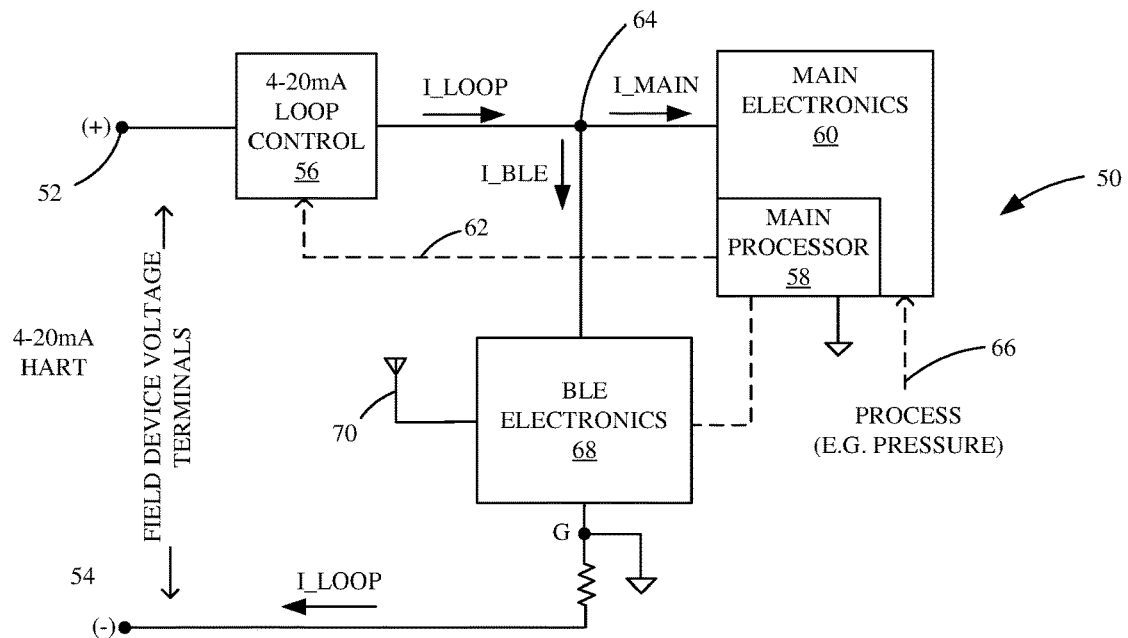
FIG. 2 is a system block diagram of field device electronics in accordance with one embodiment.

FIG. 2 is a system block diagram of electronics 50 of a field device 32 in accordance with one embodiment. Electronics 50 includes a pair of terminals 52, 54 that are coupleable to a two-wire process control loop, such as process control loop 36 (shown in FIG. 1). In the illustrated example, terminal 52 is coupled to 4-20 mA loop control module 56 which is able to set, or otherwise determine, the level of current flowing therethrough based upon a signal received from main processor 58 of main electronics 60 as illustrated diagrammatically at phantom line 62. The loop current exiting loop control module 56 is labeled I_Loop. This current flows into node 64 where it splits into main electronics current (I_Main) and Bluetooth Low Energy electronics current (I_BLE). As can be appreciated, I_Main provides operating current for main electronics 60, including main processor 58. Main electronics 60 provides all functions related to the operation of the field device. For example, in the illustrated embodiment, main electronics 60 is coupled to or receives a sensor signal 66 indicative of a process variable (pressure, for example) and generates a process variable output based upon the sensed process variable. The process variable output is provided by main processor 58 by commanding loop control module 56 to set a loop current that corresponds with the process variable. As can also be seen, BLE electronics 68 is powered by current I_BLE. BLE electronics 68 is communicative coupled to main processor 58 such that main processor can communicate wirelessly with one or more remote devices using BLE electronics 68. BLE electronics module 68 can include commercially-available Bluetooth Low Energy integrated circuits or any custom circuit that complies with the Bluetooth Low Energy specification. As can be seen, BLE electronics 68 is operably coupled to BLE wireless communication port 70, illustrated diagrammatically as an antenna.

As can be appreciated, the available input power for the field device with the BLE electronics module 68 varies based on the 4-20 mA loop control governed by the field device main processor 58 based on the measured process variable (illustrated diagrammatically at reference numeral 66). The available current for the BLE electronics (I_BLE) is governed by Equation 1 set forth below.

$$I\_BLE = I\_LOOP - I\_Main \quad \text{Equation 1}$$

I_Loop is the 4-20 mA loop current and I_Main is the main electronics current consumption. The return currents from the main electronics and the BLE electronics are combined at the circuit common (labeled G in FIG. 2). Both I_Loop and I_Main are subject to change at any point in time asynchronously from each other. The I_Loop current is a function of the field device measuring process. The I_Main current is dynamic as well based on the field device functional activities. For example, I_Main increases by 1 mA when digital communications with the process variable transmitter subsystems are in progress. As a result, the I_BLE current varies over time depending on the values of I_Loop and I_Main. In one example, I_BLE can change between 300 µA and 5 mA.

Figure 3:
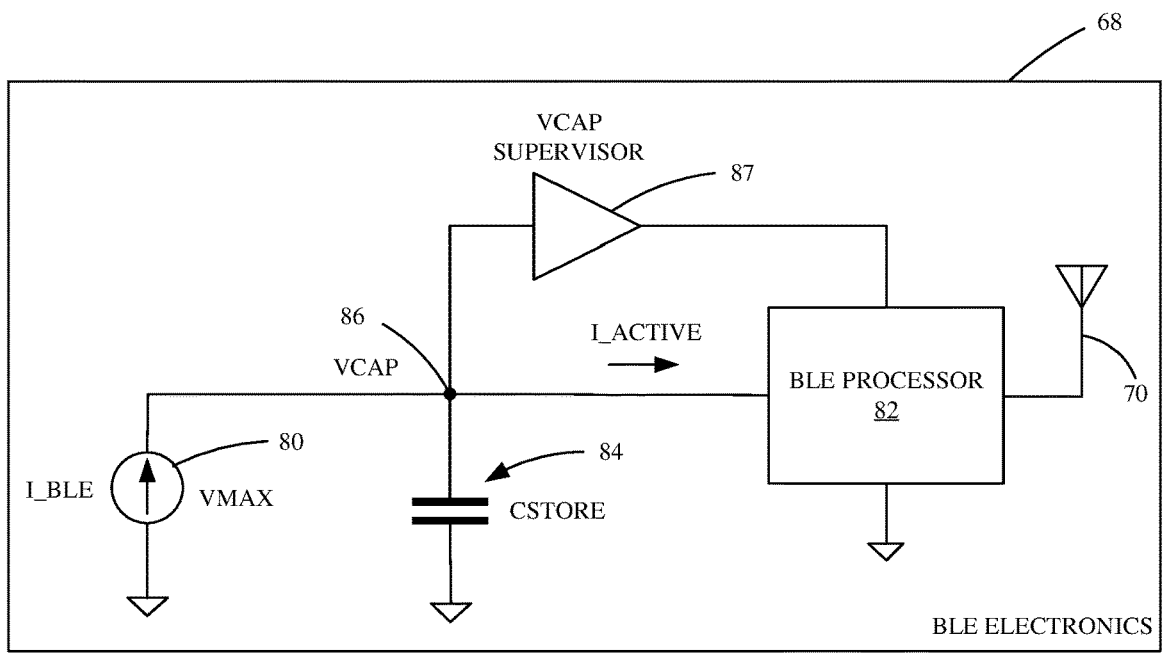
FIG. 3 is a system block diagram of a BLE electronics module in accordance with one embodiment.

FIG. 3 is a system block diagram of BLE electronics module 68 in accordance with one embodiment. As shown in FIG. 3, I_BLE is represented as an idea current source 80 with voltage limiting, VMAX. The BLE processor 82 is the primary BLE power load responsible for the BLE functions (e.g., communicate data via BLE wireless communication port). The BLE active current consumption (I_active), is sometimes higher than the available input current I_BLE. For example, I_active for the commercially-available BLE processor sold under the trade designation CC2642R2F available from Texas Instruments of Dallas, Tex., is 3 mA. However, as set forth above, the potential current supplied as I_BLE can be as low as 300 µA. Consequently, BLE electronics 68 utilize capacitor C_store 84 as an energy source which supplies power to BLE electronics 68 during an active mode in cases where I_active is greater than I_BLE. During a sleep mode, BLE processor 82 goes to sleep and I_active is only a few microamps which allows C_store to be recharged by the I_BLE current to its maximum voltage VMAX.

As illustrated, VCAP 86 is the voltage supply for BLE processor 82. The VCAP voltage is proportional to the current difference between I_active and I_BLE. When I_active is greater than I_BLE, the BLE electronics active time is limited in order to avoid a VCAP voltage brownout. In fact, once the active time limit is reached, BLE processor 82 must halt all activities and enter its sleep mode. The activities can only resume after C_store is recharged to VMAX. The active time is tracked using a real-time clock in BLE processor 82.

VCAP supervisor 87 is, in one embodiment, a voltage comparator that signals BLE processor 82 when VCAP voltage reaches VMAX. At that time, BLE processor 82 is interrupted from its sleep mode and allowed to switch back to active mode to continue BLE activities. The active mode resumes until the active time limit is reached after which, the C_store recharge repeats.

Figure 4:
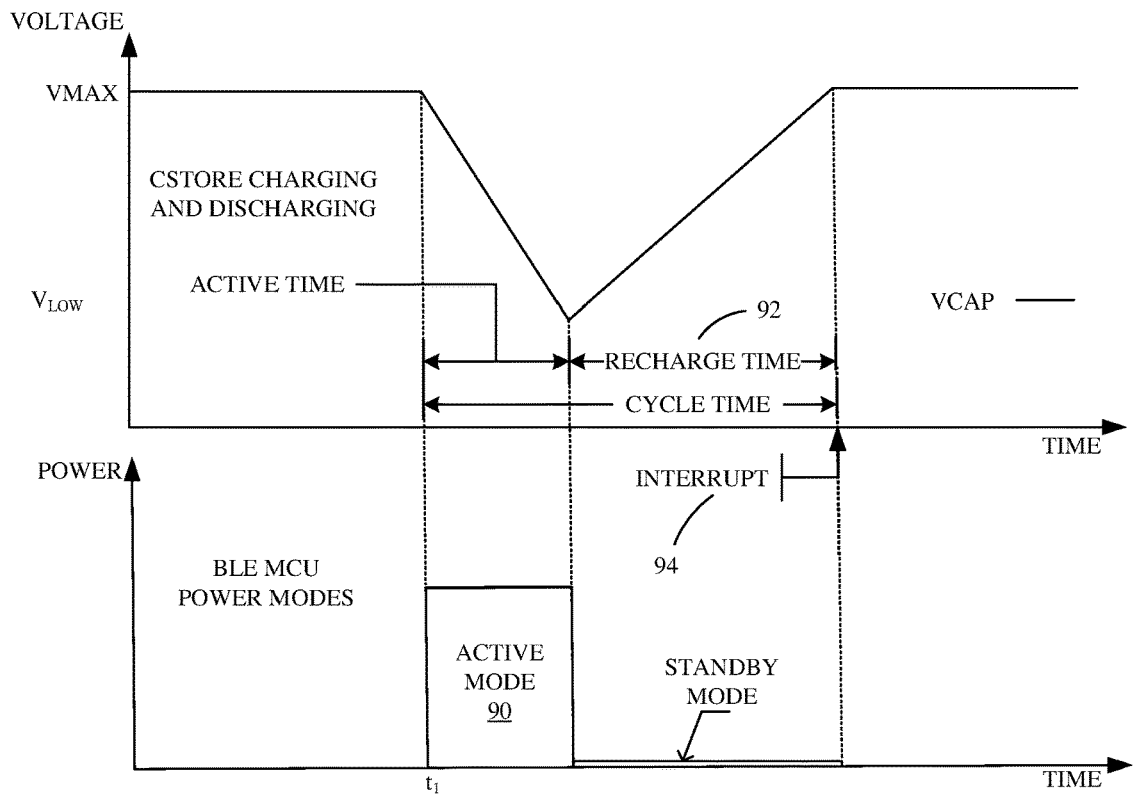
FIG. 4 is a timing diagram illustrating C_store charging and discharging during power management in accordance with one embodiment.

FIG. 4 is a timing diagram illustrating C_store charging and discharging during power management in accordance with one embodiment. As can be seen, at time $t_1$, BLE processor 82 enters active mode, illustrated diagrammatically at reference numeral 90, during which time VCAP voltage 86 decreases from VMAX to $V_{low}$. When this occurs, active mode 90 is halted, and BLE processor 82 enters its sleep mode while C_store recharges. This recharge time is illustrated diagrammatically at reference numeral 92. The recharge time ends when VCAP reaches VMAX and VCAP supervisor 87 generates an interrupt 94 to BLE processor 82. The active time transfer function is set forth below in Equation 2.

$$\text{Active Time} = C\_store\left(\frac{VMAX - VCAP}{I\_active - I\_BLE}\right) \quad \text{Equation 2}$$

for I_active > I_BLE

The Active Time in Equation 2 is defined for conditions where I_active is greater than I_BLE, otherwise the VCAP voltage stays at VMAX during the entire cycle time. The recharge time transfer function is set forth below in Equation 3.

$$\text{Recharge Time} = C\_store\left(\frac{VMAX - VCAP}{I\_BLE}\right) \quad \text{Equation 3}$$

for VCAP < VMAX

The recharge time transfer function of Equation 3 is similar to Equation 2 except I_active is much smaller than I_BLE so I_active is negligible. The cycle time is the combined active time and recharge time. Thus, cycle time=active time+recharge time.

Embodiments described herein generally address situations when the required current of I_BLE is greater than that which can be provided currently by the current loop.

Figure 5:
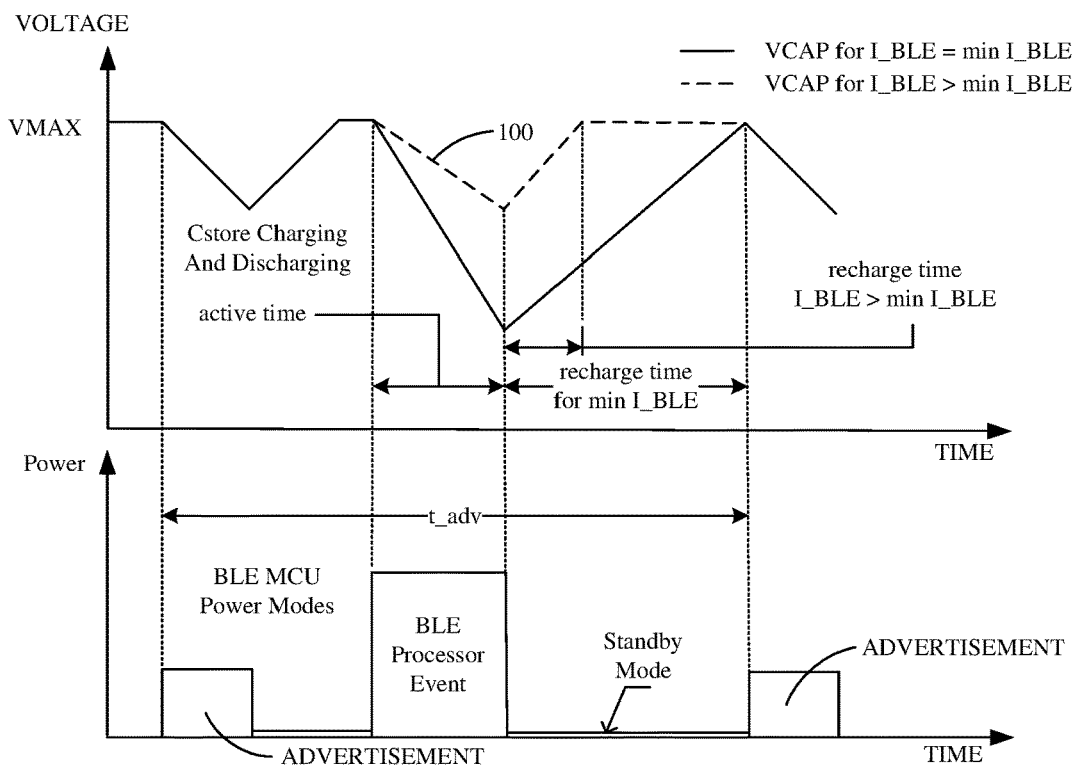
FIG. 5 is a timing diagram illustrating two BLE events when I_active is greater than I_BLE.

FIG. 5 is a timing diagram illustrating two exemplary BLE events when I_active is greater than I_BLE. There are two types of active mode events: One event type being periodic, for example, BLE advertisements with a fixed advertisement interval, T_adv; and a second type of event such as a BLE processor event. A BLE processor event is any generic processor task, for example, generating security keys used by cryptographic algorithm. Within a given T_adv, the BLE processor event active time is limited by the minimum I_BLE. The combined active and recharge cycle time for the BLE processor event must be shorter than T_adv such that the advertisement event can start with a C_store at voltage VMAX. Also, the recharge time must account for the minimum I_BLE in accordance with Equation 3 set forth above. The recharge time is maximum at the minimum I_BLE.

A problem occurs when the actual I_BLE is greater than I_BLE minimum. In this case, the recharge time is reduced based on Equation 3 represented by dashed line 100 in FIG. 5. Furthermore, the recharge time reduction allows the active time limit to increase. This results in the higher efficiency for the BLE system. However, without the BLE processor knowledge of the actual I_BLE value, the power manager design defaults to using the minimum I_BLE for all values of I_BLE. As a result, the BLE system suffers from data throughput inefficiency at the higher than minimum I_BLE. In accordance with embodiments described herein, the BLE electronics are provided with an I_BLE measurement facility that is low cost and energy efficient. Furthermore, processing the I_BLE measurement is done in such a way as to maximize active time as a function of measured I_BLE.

Figure 6:
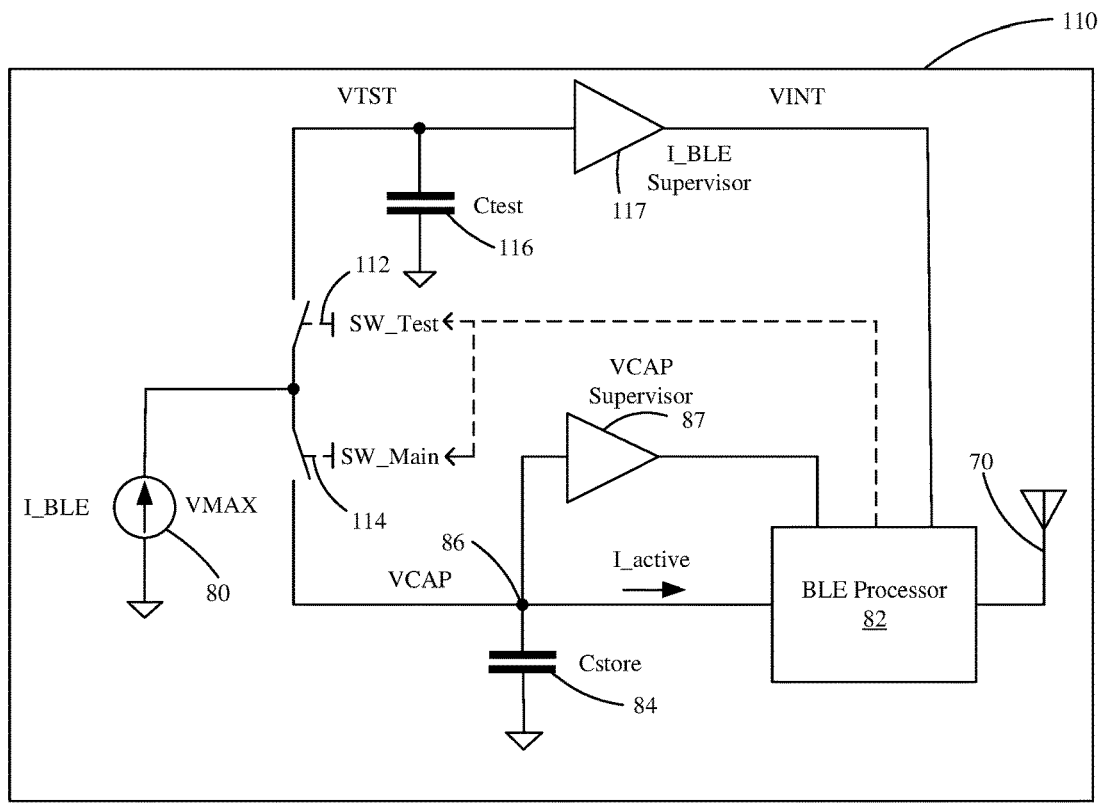
FIG. 6 is a diagrammatic view of an improved BLE electronics module in accordance with one embodiment.

FIG. 6 is a diagrammatic view of an improved BLE electronics module in accordance with one embodiment of the present invention. Some components of improved module 110 are similar to components described with respect to module 68 (shown in FIG. 3) and like components are numbered similarly. As can be seen, an additional input and an additional output are employed with respect to BLE processor 82. In the illustrated example, two complementary analog switches 112, 114, are added for BLE processor 82 to select between I_BLE measurement operation and the previously discussed operation referenced in FIG. 3. As complementary analog switches, when one of analog switches 112 is engaged, the other analog switch must be disengaged. More particularly, when SW_Main switch 114 is closed, SW_Test switch 112 is open and the BLE system operates exactly as described above with respect to FIG. 3. However, when SW_Test switch 112 is closed and SW_Main switch 114 is open, BLE processor 82 performs a measurement of I_BLE current. FIG. 6 also illustrates I_BLE supervisor 117 operably coupled to Ctest 116 and BLE processor 82. In one example, I_BLE supervisor 117 is a comparator. I_BLE supervisor 117 provides a signal (VINT) to BLE processor 82 when VTST reaches threshold VTH.

Figure 7:
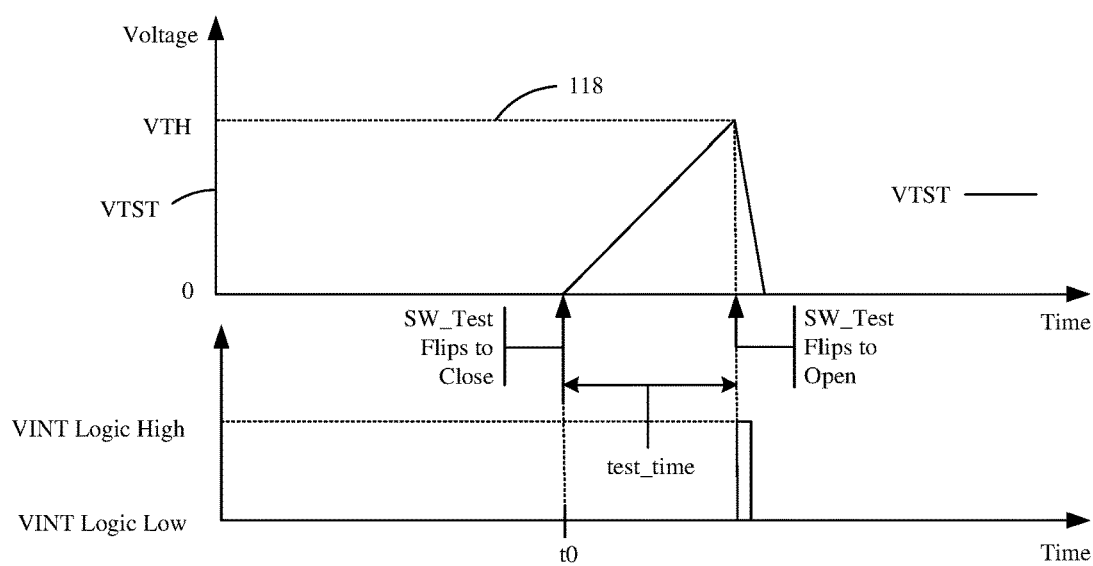
FIG. 7 is a timing diagram for I_BLE measurement in accordance with one embodiment.

FIG. 7 is a timing diagram for I_BLE measurement in accordance with one embodiment. At time $t_0$, BLE processor 82 changes from active to sleep mode and starts the real-time clock. For the duration of I_BLE measurement, Test_Time, BLE processor 82 remains in the sleep mode and I_active current consumption is a few microamps. At time t0, the I_BLE current is diverted by SW_Test switch 112 and charges test capacitor Ctest 116 until its voltage reaches a threshold voltage VTH 118. When VTST reaches VTH, I_BLE supervisor 117 (voltage comparator) output signal VINT switches from logic low to logic high which interrupts BLE processor 82 from sleep. At that time, BLE processor 82 switches to active mode, stops the real-time clock, and opens SW_Test switch 112 (thereby closing SW_Main switch 114). Next, BLE processor 82 performs a simple I_BLE calculation while power is supplied from C_store 84. The I_BLE measurement calculation is done by rearranging Equation 3 to provide Equation 5 below.

$$\text{I\_BLE\_meas} = Ctest\left(\frac{VTH}{\text{Test\_Time}}\right) \quad \text{Equation 5}$$

The constants VTH and Ctest in Equation 5 play an important role in making the I_BLE measurement energy efficient. The BLE processor operating voltage for the commercially available BLE module set forth above is 1.8 volts. Therefore, to avoid voltage level shifting, it is advantageous to set VTH to 1.8 V. The real-time clock resolution of the same BLE processor is approximately 30 microseconds. Therefore, Ctest is selected such that Test_Time is sufficiently long over I_BLE span. The use of precision timers over real-time clock in the BLE processor is generally not preferred due to relatively high timer current consumption. Table 1 below provides two Ctest example values at VTH=1.8 V for lower and upper values of the I_BLE, 300 µA and 3 mA, respectively. 3 µA is the I_active for the BLE processor, and I_BLE maximum MAX is 5 mA.

TABLE 1

| Example # | Ctest | Test_Time | I_BLE_meas Precision | Energy Consumption |
|---|---|---|---|---|
| 1 | 0.15 µF | 900 µS<br>90 µS | 300 ± 10 µA<br>3 ± 0.75 mA | 0.13% total |

TABLE 1-continued

| Example # | Ctest | Test_Time | I_BLE_meas Precision | Energy Consumption |
|---|---|---|---|---|
| 2 | 0.3 µF | 18000 µS | 300 ± 0.01 µA | 2.6% total |
|   |        | 1800 µS  | 3 ± 0.05 mA   |            |

As set forth above in Table 1, the Energy Consumption column is the percent of total energy available for conducting the I_BLE measurement. For the example BLE measurement electronics set forth above, the total available energy is approximately 380 microjoules. The I_BLE measurement precision can improve by selecting a larger Ctest, refer to example 2 in Table 1. However, the lower Ctest value benefits from faster Test_Time and lower energy consumption.

The high precision I_BLE_meas may not be needed for high values of I_BLE due to fast C_store recharge time in this case. This is especially true when I_BLE is greater than I_active, for example I_BLE=5 mA and I_active=3 mA, in which case VCAP supervisor 87 would signal the BLE processor that the VCAP voltage is at the VMAX level continuously and C_store recharge time will stay at zero.

The frequency of the I_BLE measurement depends on the expected rate for change of the I_BLE current. The field device's loop rate of change time constant is, in one embodiment, 12 mS. The I_Main rate of change is difficult to quantify but it can be assumed to be in the single digits millisecond range. Considering these rates of change, and example 1 in Table 1, the I_BLE measurement frequency could be set to 200 Hz or once every 5 milliseconds.

Figure 8:
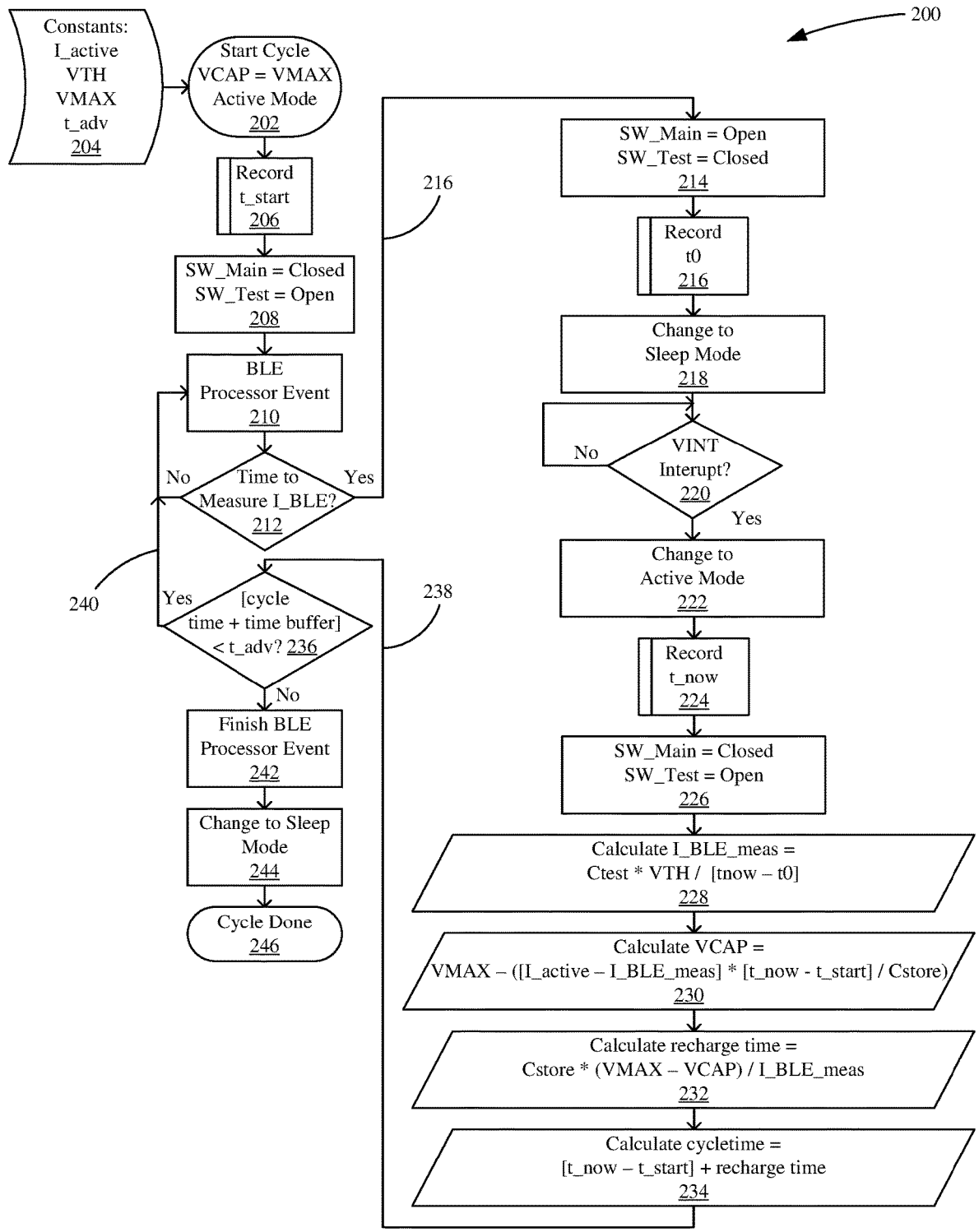
FIG. 8 is a flow diagram of a method of operating a Bluetooth Low Energy module with improved integrated I_BLE measurement in accordance with one embodiment.

FIG. 8 is a flow diagram of a method of operating a Bluetooth Low Energy module with improved integrated I_BLE measurement in accordance with one embodiment. The method can extrapolate the cycle time for the BLE processor event based on the measured I_BLE value. The cycle time is periodically recalculated based on the I_BLE measurement frequency. The BLE processor event duration, i.e., active time, extends until the extrapolated cycle time gets near the advertisement period. The cycle time extrapolation is prone to exceed the advertisement period prior to finishing the BLE processor event during fast high-to-low transitions of the I_BLE current. A time buffer is added to the end of the cycle time to mitigate this issue. The duration of the time buffer should be short, otherwise data throughput efficiency benefits of the method are reduced. Increasing the I_BLE measurement frequency or other methods are possible in order minimize the time buffer.

Method 200 begins at block 202 which receives constants 204 in the form of I_active, VTH, VMAX, and T_adv. At block 202, VCAP equals VMAX and active mode is engaged. Next, at block 206, a real-time clock of the BLE processor is used to set and record a T_start value. At block 208, SW_Main analog switch 114 is closed (referring to FIG. 6) and SW-Test switch 112 is open. At block 210, BLE processor 82 executes a BLE processor event. After the processor event is executed, control passes to block 212, where it is determined whether it is time to measure I_BLE. If it is not time to measure I_BLE, control returns to block 210, and BLE processor 82 may execute another processor event. As can be appreciated, this process may iterate until it is finally time to measure I_BLE at which time control passes to block 214 via line 260.

At block 214, BLE processor 82 opens SW_Main analog switch 114 and closes SW_Test switch 112. Control then passes to block 216 where BLE processor 82 records time to based on its real-time clock. Then, BLE processor 82 changes to sleep or standby mode as indicated at block 218. At block 220, method 200 determines whether a VINT signal or interrupt has been received. If not, the method waits until VINT is finally received, at which time control passes to block 222. At block 222, BLE processor 82 changes to active mode, and control passes to block 224 where BLE processor 82 records T_now based on its real-time clock. Next, control passes to block 226 where SW_Test switch 112 is opened, and SW_Main switch 114 is closed. Control then passes to block 228, where BLE processor 82 calculates I_BLE_meas=Ctest(VTH/(T_now-$t_0$)). Control passes to block 230 where BLE processor 82 calculates VCAP=VMAX-((I_active-I_BLE_meas)*(T_now-T_start)/Cstore). The recharge time is then calculated at block 232 as being equal to C_store*(VMAX-VCAP)/I_BLE_meas. Finally, control passes to block 234, where the cycle time is calculated as (T_now-T_start)+recharge time. With these values calculated, control passes to block 236 where it is determined whether the cycle time plus a time buffer is less than T_adv. If so, control returns to block 210 via line 240. If not, however, control passes to block 242 where the BLE processor 82 finishes the BLE processor event. When this is done, control passes to block 244 where BLE processor 82 changes to sleep or standby mode and ends the cycle at block 246.

In summary, the method described with respect to FIG. 8 generally maximizes the active time as a function of measured I_BLE which in effect maximizes data throughput.

Although the present invention has been described with reference to preferred embodiments, workers skilled in the art will recognize that changes may be made in form and detail without departing from the spirit and scope of the invention.

What is claimed is:

1. A field device comprising:
a plurality of terminals coupleable to a process communication loop:
a loop control module coupled to one of the plurality of terminals and configured to control an amount of current flowing through the loop control module based on a control signal;
a field device main processor operably coupled to the loop control module to receive its operating current (I_Main) from the loop control module and being configured to provide the control signal based on a process variable output;
a power wireless communication module operably coupled to the loop control module to receive its operating current (I_BLE) from the loop control module, the low power wireless communication module being communicatively coupled to the field device main processor; and
wherein the field device is a loop-powered field device and the low power wireless communication module has an active mode and a sleep mode, and wherein the low power wireless communication module is configured measure operating current (I_BLE) available to the low power wireless communication module while the low power wireless communication module is in the sleep mode and modify an active cycle of the low power wireless communication module based on the measurement of operating current (I_BLE).

2. The field device of claim 1, wherein the low power wireless communication module includes a pair of complementary switches each having a switch state that is opposite the other, the pair of complementary switches being operably coupled to a low power wireless communication module processor to control the switch states.

3. The field device of claim 2, wherein during the active mode, a first switch of the pair of complementary switches is closed and charges a main capacitor that is coupled to the low power wireless communication module processor.

4. The field device of claim 3, wherein the low power wireless communication module processor is configured to command the first switch to open and a second switch of the pair of complementary switches to close during a measurement function during which the low power wireless communication module is in the sleep mode and a test capacitor is charged.

5. The field device of claim 4, wherein the low power wireless communication module includes a test current supervisor operably coupled to the test capacitor and configured to generate a signal to cause the low power wireless communication module processor to change from sleep mode to active mode.

6. The field device of claim 5, wherein the test current supervisor is configured to generate the signal when a voltage of the test capacitor meets a selected threshold voltage.

7. The field device of claim 5, wherein the test current supervisor is a comparator.

8. The field device of claim 5, wherein the test capacitor has a value of about 0.15 microfarads.

9. The field device of claim 5, wherein the test capacitor has a value of about 0.3 microfarads.

10. The field device of claim 1, wherein the low power wireless communication module is configured to communicate at a frequency of 2.4-2.4835 GHz.

11. The field device of claim 1, wherein the field device main processor is operably coupled to a process sensor to measure a value of the process sensor and generate the process variable output based on the measured value.

12. The field device of claim 11, wherein the process variable output is provided as a current ranging between 4 and 20 milliamps and wherein the field device is configured to be wholly powered by the loop current.

13. A low power wireless communication module for a loop-powered held device, the low power wireless communication module being configured to wireless communicate with at least one remote device and receive a variable operating current (I_BLE), the low power wireless communication module comprising:
 a pair or complementary switches each having a switch state that is opposite the other, the pair of complementary switches, the pair of complementary switches being controlled by a control signal;
 a low power wireless communication module processor coupled to the pair of complementary switches and being configured to provide the control signal;
 a test current supervisor operably coupled to a test capacitor and configured to generate a signal to cause the low power wireless communication module processor to change from a sleep mode to an active mode, wherein the test current supervisor is configured to generate the signal when a voltage of the test capacitor meets a threshold voltage; and
 wherein the low power wireless communication module is configured to obtain a measurement of the operating current (I_BLE) available while the low power wireless communication module is in the sleep mode and modify an active cycle of the low power wireless communication module based on the measurement of operating current (I_BLE).

14. The low power wireless communication module of claim 13, wherein the low power wireless communication module processor is configured to command the first switch to open and a second switch of the pair of complementary switches to close during a measurement function during which the low power wireless communication module is in the sleep mode and the test capacitor is charged.

15. The low power wireless communication module of claim 13, wherein the threshold voltage is 1.8 volts.

16. The low power wireless communication module of claim 13, wherein the test current supervisor is a comparator.

17. The low power wireless communication module of claim 13, wherein the variable operating current varies between 300 microamps and 5 milliamps.

* * * * *